United States Patent [19]
Kobayashi et al.

[11] Patent Number: 5,991,592
[45] Date of Patent: Nov. 23, 1999

[54] DOCUMENT TRANSPORTING DEVICE AND METHOD AND IMAGE READING DEVICE PROVIDED WITH THE DOCUMENT TRANSPORTING DEVICE

[75] Inventors: Hiroshi Kobayashi; Shigeo Kurando; Masaki Deguchi; Jun Kusakabe, all of Osaka, Japan

[73] Assignee: Mita Industrial Co., Ltd., Osaka-fu, Japan

[21] Appl. No.: 09/196,305

[22] Filed: Nov. 19, 1998

[30] Foreign Application Priority Data

Nov. 21, 1997 [JP] Japan ................................. 9-321563

[51] Int. Cl.[6] .................................................. G03L 15/00
[52] U.S. Cl. ........................... 399/374; 271/3.14; 358/496
[58] Field of Search ..................................... 399/364, 373, 399/374, 367; 271/3.14, 3.19, 186; 355/23, 24; 358/496, 498

[56] References Cited

U.S. PATENT DOCUMENTS 5,669,056   9/1997   Rubscha ................................. 399/367

*Primary Examiner*—Joan Pendegrass
*Attorney, Agent, or Firm*—Jordan and Hamburg LLP

[57] ABSTRACT

A document fed from a document tray to a first transport path is guided to a document inverting unit to invert a transport direction of the document. Subsequently, the document is transported to an image reader unit along a second transport path for image data reading on the opposite side of the document opposite to a side facing upward when set on the document tray. Then, the document is guided to the document inverting unit again via a fourth transport path intersecting a third transport path at a first intersecting point to invert the transport direction of the document again. Thereafter, the document is transported to the image reading unit again via the second transport path for image data reading on the one side of the document. The document is discharged onto a discharge tray via the third transport path with the one side facing downward.

13 Claims, 7 Drawing Sheets

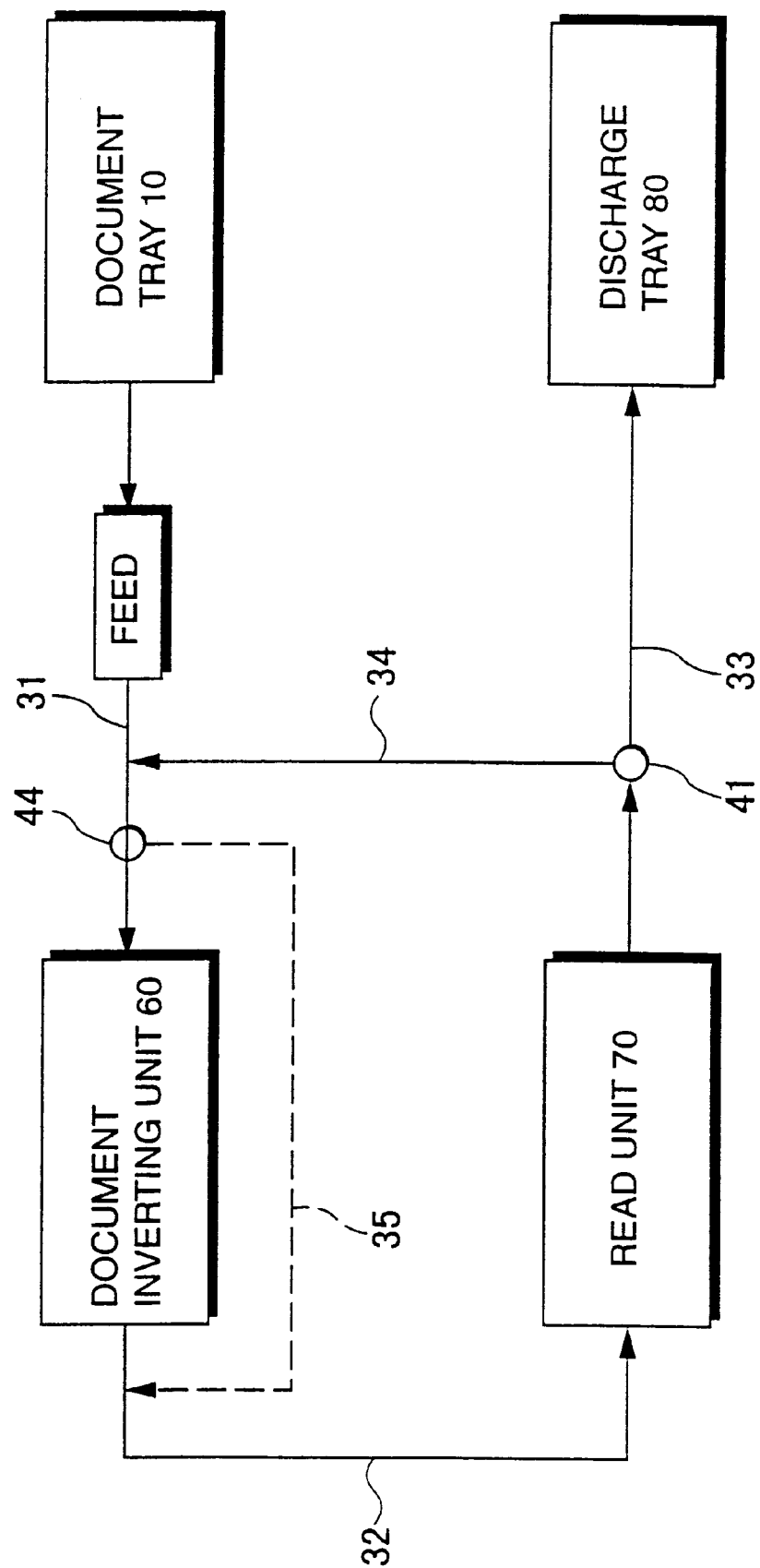

DOCUMENT TRANSPORTING DEVICE AND METHOD AND IMAGE READING DEVICE PROVIDED WITH THE DOCUMENT TRANSPORTING DEVICE

BACKGROUND OF THE INVENTION

This invention relates to a document transporting device and method for use with copiers, image scanners, facsimile machines and the like, for successively transporting a set of documents to enable image data reading on both sides of each of the documents, and an image reading device provided with the same.

FIGS. 6A–6E show an example of an image reading device and an image reading operation of prior art. As shown in FIG. 6A, this image reading device is constructed in such a manner that a set of documents stacked on a document tray 10 are fed one by one by a document separator/feeder 20 onto a predetermined image reading position 71 of an image reading unit 70 to enable image data reading on one side (corresponding to a side facing upward on the document tray 10) of the document. In the case of double sided image reading operation, after passing the image reading position 71, the document is transported to a document inverting unit 60 where the document is turned upside down while having the transport direction thereof inverted along a switchback path (inverting path) provided therein. After turning the document side in the document inverting unit 60, the document is transported to the image reading position 71 again to enable image data reading on the opposite side of the document that faces downward on the image reading unit 70 this time.

Let us illustrate procedures of double sided image reading operation performed by the prior art image reading device with graphical indications that, in FIG. 6, $P_{11}$ denotes the first page of a first sheet, $P_{12}$ denotes the second page of a first sheet, . . . , $P_{n1}$ denotes the odd number page of n-th sheet (last document), and $P_{n2}$ denotes the even number page of the last document.

The above set of documents carrying image data on both sides of each of the documents are generally stacked on the document tray 10 in such a manner that the first page $P_{11}$ comes the uppermost position of the document set facing upward, the second page $P_{12}$ faces downward, . . . , and the last even number page $P_{n2}$ comes the lowermost position facing downward (in other words, they are stacked such that $P_{11}$, $P_{12}$ $P_{21}$, $P_{22}$, . . . , $P_{n1}$, and $P_{n2}$ from the uppermost position in this order as shown in FIGS. 6A and 6B).

The set of documents on the document tray 10 is fed from the uppermost document ($P_{11}$ & $P_{12}$) for the following reason. Generally, a set of documents stacked on the document tray 10 are separated one by one by a frictional force exerted on the surface of the document in contact with a feeder roller or its equivalent, and fed inside a main body of the image reading device. If the document set is fed from the lowermost document, a relatively large force to press the whole set of documents downward is required to cause the feed roller to assuredly feed in the lowermost document to the device main body. Such a large pressing force increases the frictional force of the document fed by the feed roller. Thereby, it is highly likely that the image of the document being fed by the feed roller is smeared with the image of the document in contact therewith or vice versa. To avoid such a problem, the image reading device is so constructed as to allow a set of documents stacked on the document tray 10 to be fed from the uppermost sheet.

Referring back to the document set stacked on the document tray 10, after the double sided image reading operation according to the document transport procedure carried out by the above image reading device, assuming that there was no further document inverting step, each of the documents is discharged on the discharge tray 80 with the side of the odd number page facing upward and stacked one over another successively (see dotted lines in FIG. 6D). Accordingly, what would have been obtained on the discharge tray 80 at the step as shown in FIG. 6D, assuming that there was no further document inverting step, is the document set stacked in the order of $P_{n1}$, $P_{n2}$, $P_{(n-1)1}$, $P_{(n-1)2}$, . . . $P_{21}$, $P_{22}$, $P_{11}$, and $P_{12}$ from the uppermost position, the order different from the initial order when stacked on the document tray 10.

To avoid the document set on the discharge tray 80 arranged in the reversed order as the document tray 10, the above image reading device is constructed such that the document after the double sided image reading operation is transported back to the document inverting unit 60 to turn the document side (see FIG. 6D), thereby discharging the documents on the discharge tray 80 in the order that the odd number page of the documents faces downward after passing the image reading position 71 (this time no image reading). Thereby, the document set is discharged on the discharge tray 80 without changing the order of page number (see dotted lines in FIG. 6E), in the same order as the document tray 10.

Summing up the above operation, the above image reading device is operated such that each document passes the image reading position 71 three times (the first is for a one side image reading operation; the second is for an opposite side image reading operation; and the third is for no image reading operation as shown in FIGS. 6B, 6C, and 6D) in total to perform double side image reading and be discharged on the discharge tray 80 in the same order as the document tray 10.

Note that $P_{IA}$ in FIG. 6B represents the document whose image has not yet been read; $P_{IB}$ in FIGS. 6B and 6C represents the document whose one side image reading has been done; $P_{IC}$ in FIG. 6D represents the document whose double sided image reading operation has been done; and $P_{ID}$ in FIG. 6E represents the document whose orientation on the discharge tray 80 is upside down (flipped over) to the orientation of the document indicated by $P_{IC}$ shown in FIGS. 6C and 6D.

It should be recognized by now that the last (third) operation is unnecessary so far as the image reading operation is concerned, and it may cause smear on a contact glass at a position corresponding to the image reading position 71 because of this additional passing and lead to a poor image formation.

Further, in the above image reading device, the discharge tray 80 is provided on an extended area of the inverting path provided in the document inverting unit 60. Accordingly, it is highly likely that a lead end (left side in FIG. 6A) of the document on the way of inverting the transport direction along the inverting path (the direction R in FIG. 6A) may push the documents that have already been stacked on the discharge tray 80 without alignment/holding means, thereby resulting in non-alignment of the discharged document set, or in the worst case, sliding off the discharged document(s).

There is an idea of setting the discharge tray 80 vertically at a lower position relative to the inverting path so as not to interfere with the inverting movement of the document, thereby preventing a non-aligned state of the document set on the discharge tray 80 or slipping off of the document(s) from the discharge tray 80. This idea, however, unavoidably enlarges the vertical dimension of the image reading device as a whole.

There is another idea of providing a sub tray between the document tray 10 and the discharge tray 80 to hold the document on the way of inverting the transport direction along the inverting path. Providing such a sub tray, however, also enlarges the vertical dimension of the image reading device as a whole. Furthermore, when taking out the document set from the discharge tray 80, a user must lift up the document tray 10 and the sub tray to access to the discharge tray 80, which is not feasible in the aspect of operability of the image reading device.

SUMMARY OF THE INVENTION

In view thereof, it is an object of the present invention to provide a document transporting device which has overcome the problems residing in the prior art.

To fulfill the above object, a document transporting device, according to an aspect of the invention, for transporting a set of documents to a predetermined image reading position successively to enable reading of image data on both sides of each of the documents comprises: a document tray on which a set of documents are stacked; a document separator/feeder unit for separating the set of documents and feeding the documents one by one from an uppermost document thereof; a document inverting unit for inverting the document with respect to the transport direction thereof; a discharge tray disposed on the same side as the document tray with respect to the image reading position for discharging the document after a double side image reading; a first transport path for guiding the document fed by the document separator/feeder unit to the document inverting unit; a second transport path for guiding the document from the document inverting unit to the image reading position; a third transport path for guiding the document from the image reading position to the discharge tray; a fourth transport path intersecting the third transport path at a first intersecting point on the way of the third transport path and joining the first transport path to guide the document from the first intersecting point to the document inverting unit; and a first switching means for changing the transport path at the first intersecting point between the third transport path located on the side of the discharge tray with respect to the first intersecting point and the fourth transport path.

In the above arrangement, the documents stacked on the document tray are fed one after another to the document inverting unit along the first transport path. After turning the side of the document in the document inverting unit, the document is transported along the second transport path to the image reading position for image data reading on the opposite side of the document opposite to a side facing upward on the document tray. Thereafter, the document is guided to the fourth transport path at the first intersecting point of the third transport path by an operation of the first switching means, and transported to the document inverting unit again via the first transport path. After turning the side of the document again in the document inverting unit, the document is transported to the image reading position along the second transport path for image data reading on the one side thereof. Then, the document is discharged onto the discharge tray via the third transport path.

In this way, the document passes the image reading position only twice for double side image reading, the minimum number required for double side image reading. Accordingly, there can be suppressed a possibility of smearing an image reading unit. Further, in this arrangement, turning the side of the document twice in the document inverting unit enables stacking the document set on the discharge tray in the same order as the document tray as far as the discharge tray is disposed on the same side as the document tray.

These and other objects, features and advantages of the present invention will become more apparent upon reading of the following detailed description and accompanying drawings.

BRIEF DESCRIPTION OF THE DRAWINGS

FIG. 5 is a schematic diagram of the image reading device embodying the present invention.

DETAILED DESCRIPTION OF THE INVENTION

Figure 1:
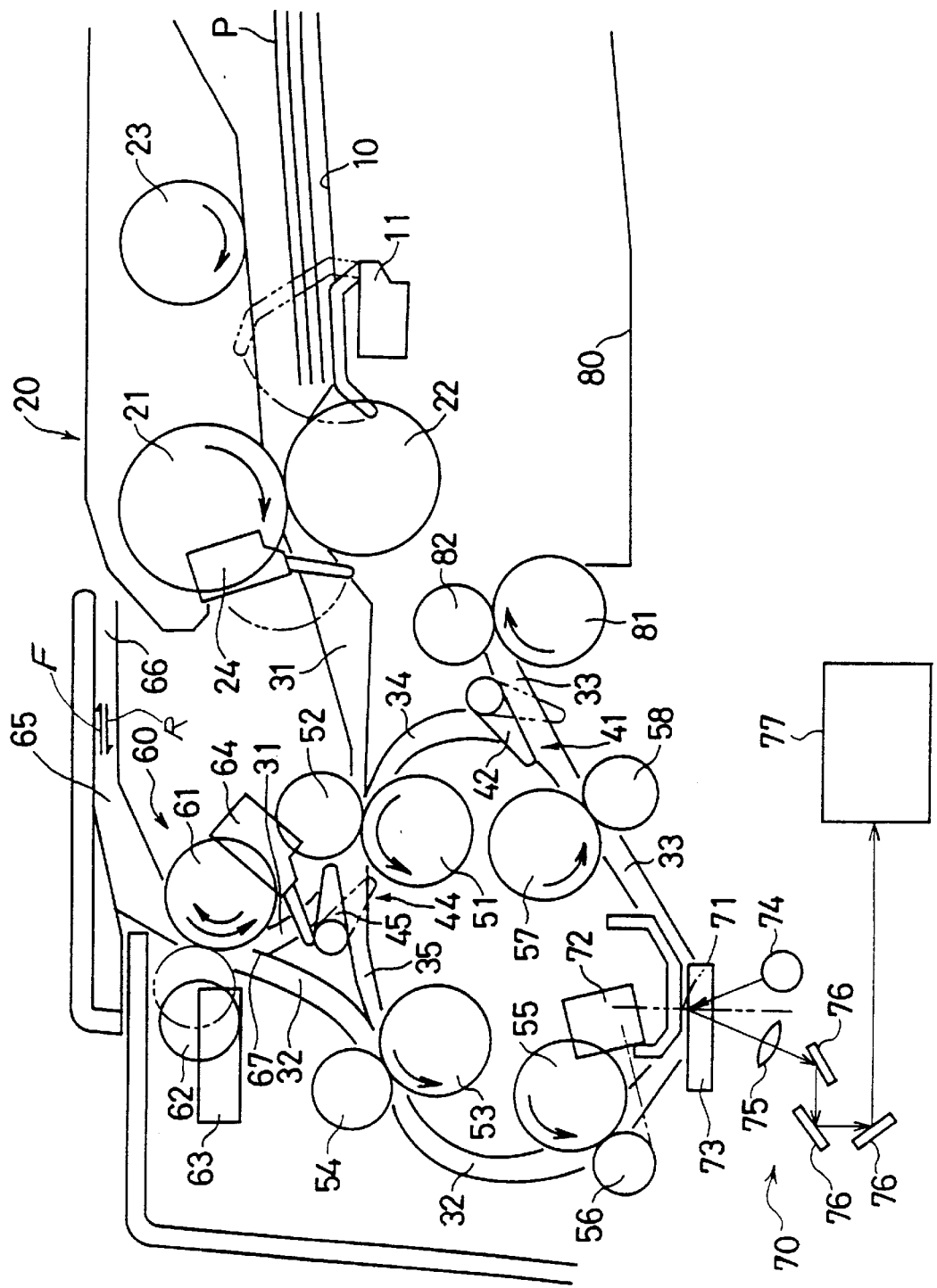
FIG. 1 is a constructional diagram showing an image reading device embodying the present invention.

FIG. 1 is a diagram of an image reading device embodying the present invention. It should be noted that elements of the image reading device which are identical to those of the conventional device are denoted at the same reference numerals.

The image reading device is constructed in such a manner that a set of documents stacked on a document tray 10 with the first page facing upward at the uppermost position and the page number increasing as stacked down are discharged on a discharge tray 80 in the same order as the document tray 10 except that the page number increases (or decreases) on the discharge tray 80 in the order opposite to the document tray 10.

Not to mention one side image reading, this image reading device enables stacking a set of documents on the discharge tray 80 in the same order as the document tray 10 in the case of double side image reading.

An image reading device for use with a copying machine is shown as an embodiment of this invention herein. However, this invention is applicable to a document transporting device by omitting an image reading unit 70 and constructing the device in such a manner as to transport a document to a predetermined image reading position 71.

[Construction of Image Reading Device]

A construction of the image reading device is described with reference to FIGS. 1 and 5. The document tray 10 is a document setting portion on which a set of documents carrying image data on one side (or both sides) thereof are stacked. A document detecting sensor 11 is provided at a bottom portion of the document tray 10 to detect the presence or absence of the document(s) on the document tray 10.

A document separator/feeder unit 20 comprises a forward roller 23, a feed roller 21, and a separation roller (driven roller) 22.

The forward roller 23 is provided above the document tray 10 to guide an uppermost sheet (referred to as a "document P" in this section) of the document set to the feed roller 21 and the separation roller 22. The feed roller 21 is rotated to feed the document P forward toward a main body of the image reading device. The separation roller 22 is arranged at a position in sliding contact with the feed roller 21 and so constructed as to follow the rotation of the feed roller 21 while causing a rotational force as being pressed by the feed roller 21.

The document P is separated from the document set stacked on the document tray 10 by the feed roller 21 and the separation roller 22 and fed to a first transport path 31. A feed sensor 24 is provided at an inlet of the first transport path 31 to detect a lead end of the document P. The thus constructed document separator/feeder unit 20 separates the set of documents on the document tray 10 and feeds the documents one by one inside the main body of the image reading device.

A registration roller 51 and a registration driven roller 52 are arranged at a specified position along the first transport path 31. The registration roller 51 is rotated to transport the document P forward, and the registration driven roller 52 is in sliding contact with the registration roller 51 to follow the rotation thereof.

The first transport path 31 has a second intersecting point 44 provided on downstream side with respect to the rotation of the registration roller 51. A fifth transport path 35 intersects the first transport path 31 at the second intersecting point 44 and extends substantially horizontal to the first transport path 31.

An inverting/non-inverting changeover lever 45 (second switching means) is provided at the second intersecting point 44 to switch the transport path between the first transport path 31 located on downstream side with respect to the rotation of the registration roller 51 from the second intersecting point 44 and the fifth transport path 35. The downstream portion of the first transport path 31 is curved upward from the second intersecting point 44.

A document inverting unit 60 comprises an inverting roller 61, an inverting driven roller 62, a presser means 63, a forward/reverse detecting sensor 64, and an inverting path 65.

The forward/reverse detecting sensor 64 is provided in the vicinity of an outlet of the first transport path 31 to detect a tail end of the document P that has passed through the first transport path 31, in other words, the tail end of the document P when the document P is transported in the forward direction (the direction F in FIG. 1) along the inverting path 65. The inverting roller 61 and the inverting driven roller 62 opposing thereto are provided at the outlet of the first transport path 31. The inverting roller 61 is rotatable in the forward and reverse direction. The inverting driven roller 62 is pressed against the inverting roller 61 by the presser means 63. Thereby, the lead end of the document P is nipped between the inverting roller 61 and the inverting driven roller 62 when transported along the downstream curved portion of the first transport path 31.

Specifically, the inverting roller pair 61, 62 is constructed such that: the document P is transported further in the forward direction (shown by the arrow F in FIG. 1) along the inverting path 65 in the nipped state while the inverting roller 61 is driven in the forward direction; switched back toward a second transport path 32, which is described later, when the document P is transported in the reverse direction (shown by the arrow R in FIG. 1) along the inverting path 65 while the inverting roller 61 is driven in the reverse direction; and firmly held by the inverting roller pair 61 and 62 when the rotation of the inverting roller 61 is suspended.

When the presser means 63 releases the pressing force exerted to the inverting driven roller 62, the inverting driven roller 62 is set away from the inverting roller 61 by a certain distance (see the solid line state of FIG. 1) to define a clearance between the inverting roller pair 61 and 62. At this time, the document P is released from the nipped state and vertically movable. Thereby, even if the lead end and the tail end of the document P cross over in the document inverting unit 60, the document P can be smoothly guided in and out of the document inverting unit 60. This operation is described later in detail.

The inverting path 65 is provided above the inverting roller pair 61, 62 to temporarily switchback the document P so as to turn the side of the document P. The inverting path 65 extends from the inverting roller pair 61, 62 substantially horizontally above the feed roller 21. The inverting path 65 has an opening 66 which opens outside the main body of the image reading device at a position above the feed roller 21 and extends toward upper part of the document tray 10.

Providing the opening 66 in the inverting path 65 enables the lead end of the document P being transported in the F direction to be temporarily exposed outside the main body while the document P has its transport direction inverted along the inverting path 65. In this arrangement, even if the document P has its longer side in the transport direction and the inverting path 65 is not long enough to cover the longer side, the switch back operation on the inverting path 65 is securely performed with the tail end thereof nipped between the inverting roller pair 61 and 62, because the lead end of the document P is exposed outside through the opening 66.

The first transport path 31 and the second transport path 32 intersect with each other at a lower portion between the inverting roller pair 61 and 62. A projecting wall 67 extending upward from a lower side wall (right side in FIG. 1) of the second transport path 32 is provided at the intersecting portion in such a way as to narrow the outlet of the first transport path 31. The document P is transported into the document inverting unit 60 along the first transport path 31 while guided along one side of the projecting wall 67, and the document P is transported out of the document inverting unit 60 while guided into the second transport path 32 along the other side of the projecting wall 67. In this way, the projecting wall 67 serves as a regulation means for regulating the transport direction of the document P at the intersecting portion.

The second transport path 32 is curved slightly upward as departing from the intersecting portion. An upper transport roller 53, an upper driven roller 54 in sliding contact with the upper transport roller 53 to follow a rotation thereof, a lower transport roller 55, and a lower driven roller 56 in sliding contact with the lower transport roller 55 to follow a rotation thereof are provided at a specified position along the second transport path 32. The document P guided in the second transport path 32 is transported to the image reading position 71 of the image reading unit 70 by the upper roller pair 53, 54 and the lower roller pair 55, 56.

The fifth transport path 35 joins the second transport path 32 on the upstream side with respect to the rotation of the upper transport roller 53. Accordingly, the document P, when transported in the second transport path 32 via the fifth transport path 35, is also securely transported to the image reading position 71 by the upper roller pair 53, 54 and the lower roller pair 55, 56.

A timing sensor 72 is provided near an outlet of the second transport path 32, immediately before the image reading position 71 to detect the lead end and the tail end of the document P being transported along the second transport path 32 and a third transport path 33 which is described later.

The image reading position 71 corresponds to a certain position on an upper surface of a contact glass 73 provided at a top portion of the copying machine to allow image data of the document facing the image reading position 71 to be read. The image reading unit 70 comprises, as well as the image reading position 71, the contact glass 73, an exposure lamp 74 for irradiating light onto the surface of the document P facing the image reading position 71 (i.e., the side facing downward in FIG. 1), an optical lens 75 for guiding light reflected from the document surface onto a group of reflective mirrors 76, and image data reader/processor 77 which detects and processes image data based on the reflected light passing through the optical lens 75 and the reflective mirrors 76.

The document P, after having the image data read by the image reading unit 70, is transported from the image reading position 71 to the third transport path 33. The third transport path 33 is formed into a substantially straight and upward slope as approaching an outlet thereof. An intermediate roller 57 and an intermediate driven roller 58 in sliding contact with the intermediate roller 57 to follow a rotation thereof are provided at a specified position along the third transport path 33. The document P is transported downstream along the third transport path 33 while being guided by the intermediate roller pair 57, 58.

A discharge roller 81 and a discharge driven roller 82 in sliding contact with the discharge roller 81 to follow a rotation thereof are provided at an outlet of the third transport path 33. The document P transported to the outlet of the third transport path 33 is discharged onto the discharge tray 80 by the discharge roller pair 81, 82. The discharge tray 80 is a document discharge portion on which the set of documents are stacked after the image reading.

The discharge tray 80 has a slightly upward slope when viewed from the side of the discharge roller pair 81, 82 (from the left side in FIG. 1) and is disposed below the document tray 10. In this arrangement, prevented is a possibility that the document P being discharged onto the discharge tray 80 pushes a set of documents that has been stacked on the discharge tray 80, accompanied by a non-aligned state of the stacked documents or sliding off the document(s) from the discharge tray 80.

A first intersecting point 41 is provided between the intermediate roller pair 57, 58 and the discharge roller pair 81, 82. A fourth transport path 34 intersects the third transport path 33 at the first intersecting point 41. A discharge changeover lever 42 (first switching means) is provided at the first intersecting point 41 to change the transport path between a downstream portion of the third transport path 33 extending from the first intersecting point 41 toward the discharge roller pair 81, 82 and the fourth transport path 34.

The fourth transport path 34 extends substantially upward from the first intersecting point 41 and joins an upstream portion of the first transport path 31.

[Control System]

A control system of the image reading device having the above construction is described with reference to FIG. 2.

Figure 2:
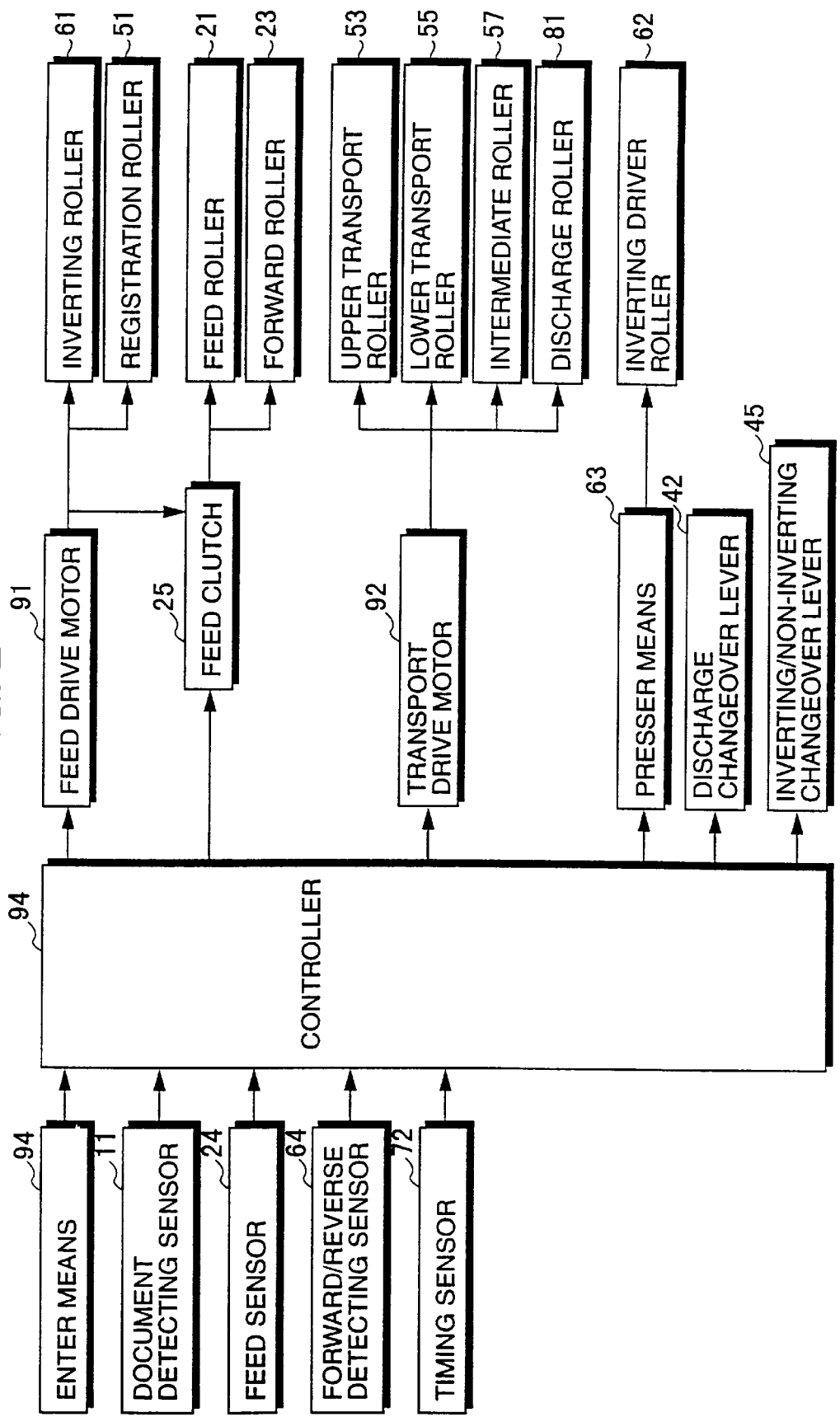
FIG. 2 is an explanatory diagram showing a control system of the image reading device.

As shown in FIG. 2, the control system has a controller 90. The controller 90 controls an overall operation of various elements of the image reading device. Upon receiving a command signal designated by a user through an enter means 94 and a detection signal from the document detecting sensor 11, the feed sensor 24, the forward/reverse detecting sensor 64, and the timing sensor 72, the controller 90 controls a feed drive motor 91, a feed clutch 25, a transport drive motor 92, the presser means 63, the discharge changeover lever 42, and the inverting/non-inverting changeover lever 45 for a predetermined operation.

The feed drive motor 91 drives the feed roller 21, the forward roller 23, the registration roller 51, and the inverting roller 61. Specifically, the feed drive motor 91 drives the feed roller 21 and the forward roller 23 via the feed clutch 25. When the feed clutch 25 is disengaged from the feed drive motor 91, the feed drive motor 91 can drive solely the inverting roller 61 and the registration roller 51. The feed drive motor 91 is constructed to rotate the inverting roller 61 in the reverse direction by reversing the rotating direction thereof.

The transport drive motor 92 is so constructed as to rotate the upper transport roller 53, the lower transport roller 55, the intermediate roller 57, and the discharge roller 81 at a constant speed in the same direction. Since what is required for these rollers 53, 55, 57, and 81 are to rotate in the same direction (forward direction) to transport the document forward, the transport drive motor 92 and the rollers 53, 55, 57, and 81 are so constructed as to set the document transport speed at a constant high level.

The controller 90 controls the image reading unit 70 to read image data at a predetermined timing.

The control system may have individual controllers instead of the controller 90: one is adapted for controlling the operation of the document transporting device, and the other is adapted for controlling the operation of the other constituent elements of the image reading device including the image reading unit 70.

[Transport Procedure]

Next, a procedure of transporting a document in the image reading device of this invention is described with reference to FIGS. 3A to 3D (single side image reading), and 4A to 4I (double side image reading).

First, described is the case of single side image reading with reference to FIGS. 3A to 3D. $P_1$, $P_2$, $P_3$ are documents having image data on one side thereof. For easier explanation, the side of the document having image data carries the mark $\Delta$. Further, the number inside or nearby the mark $\Delta$ denotes the page number.

Figure 3A:
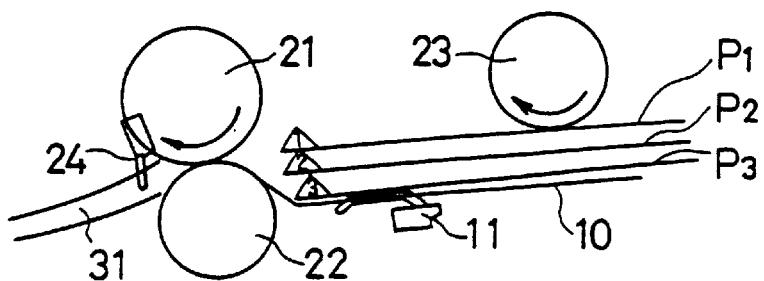
FIGS. 3A to 3D are explanatory diagrams showing a series of procedures of transporting a set of documents for single side image reading in the image reading device.

As shown in FIG. 3A, a user sets the documents $P_1$ to $P_3$ with the $\Delta$-marked side facing upward on the document tray 10, selects a single side copying mode, and designates the controller 90 to initiate image reading through the enter means 94 such as a start key.

If the document detecting sensor 11 detects the presence of the document on the document tray 10, the controller 90 starts single side image reading operation. At this time, the discharge changeover lever 42 is set at such a position as to open the third transport path 33 (to guide the document toward the discharge tray 80), and the inverting/non-inverting changeover lever 45 is set at such a position as to open the fifth transport path 35.

The documents $P_1$ to $P_3$ set on the document tray 10 are fed, as shown in FIG. 3A, toward the feed roller 21 and the separation roller 22 by rotating the forward roller 23 in the clockwise direction. At this time, the feed roller 21 is also rotated in the clockwise direction, and the uppermost document $P_1$ that is in contact with the forward roller 23 and transported by the feed roller 21 and the separation roller 22 is separated from the other documents $P_2$, $P_3$ and fed to the first transport path 31.

When the feed sensor 24 detects that the lead end of the document $P_1$ reaches the first transport path 31, the controller 90 controls the feed clutch 25 to disengage from the feed drive motor 91 at a certain timing after the lead end of the document $P_1$ has reached the registration roller 51. Thereby, the rotation of the feed roller 21 and the forward roller 23 is suspended. Thus, the documents $P_2$, $P_3$ are prevented from being fed together with the document $P_1$.

Figure 3B:
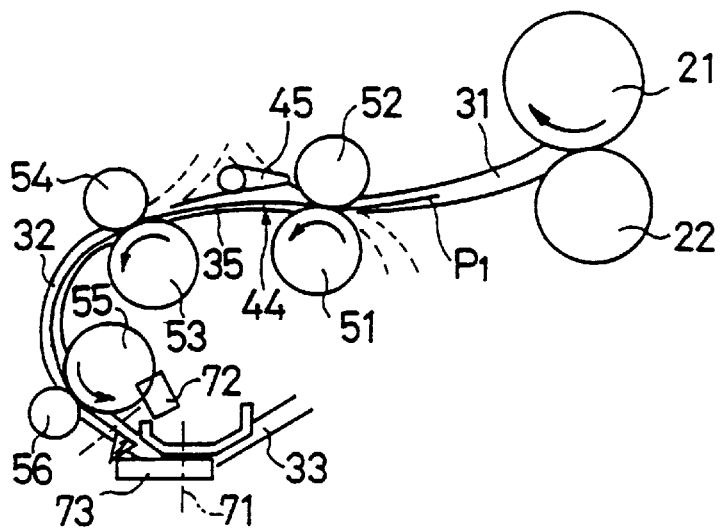

While securely guided by the registration roller pair 51, 52, the lead end of the document $P_1$ reaches the second intersecting point 44. Then, the document $P_1$ is guided into the fifth transport path 35 by the inverting/non-inverting changeover lever 45 set at the position to open the fifth transport path 35. After passing the fifth transport path 35, the document $P_1$ enters the second transport path 32 joining the fifth transport path 35 at the upstream side relative to the rotation of the upper transport roller 53. As shown in FIG. 3B, the document $P_1$ is guided toward the image reading position 71 while being transported along the second transport path 32 by the upper roller pair 53, 54 and the lower roller pair 55, 56.

When the timing sensor 72 detects the lead end of the document $P_1$ immediately before the image reading position 71, the controller 90 controls the image reading unit 70 to read image data of the document $P_1$ at a certain timing after the detection. It should be noted that, at this time, the side of the mark Δ of the document $P_1$ faces downward at the image reading position 71.

Figure 3C:
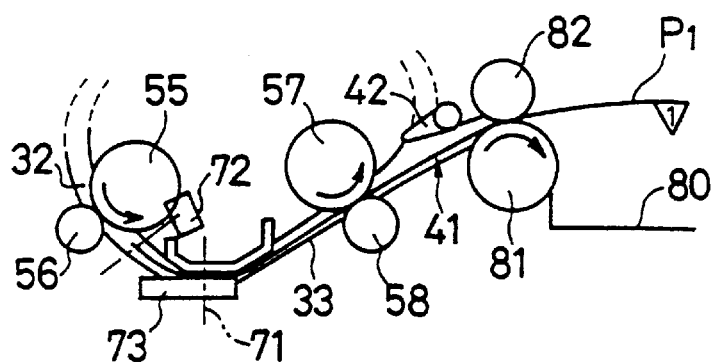

After having the image reading operation at the image reading position 71, the document $P_1$ is guided along the third transport path 33 by the intermediate roller pair 57, 58 and reaches the first intersecting point 41. Then, the document $P_1$ is guided by the discharge changeover lever 42 set at the position to open the transport path to the downstream portion of the third transport path 33 (toward the discharge tray 80) and transported along the downstream portion of the third transport path 33. Thereafter, as shown in FIG. 3C, the document $P_1$ is discharged onto the discharge tray 80 by the discharge roller pair 81, 82 with the side of the mark Δ facing downward.

When the timing sensor 72 detects that the tail end of the document $P_1$ passes the image reading position 71, the controller 90 controls the image reading unit 70 to terminate the image data reading at a certain timing after the detection.

Figure 3D:
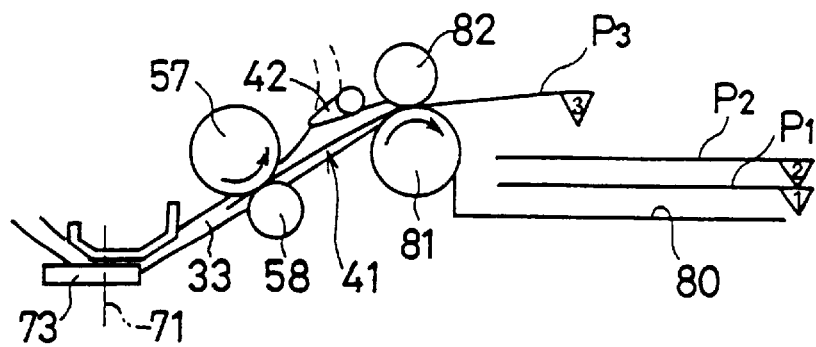

In this way, image reading of the first document $P_1$ is finished. Similar to the first document $P_1$, image reading of the second document $P_2$ and the third document $P_3$ is performed successively. After the image reading of the documents $P_1$, $P_2$, $P_3$, as shown in FIG. 3D, the documents $P_1$, $P_2$, $P_3$ are discharged on the discharge tray 80 with the Δ-marked side thereof facing downward in the order of $P_1$, $P_2$, $P_3$ from the lowermost position. In other words, the document set ($P_1$, $P_2$, $P_3$) are stacked on the discharge tray 80 in the same order as having been set on the document tray 10 except that the page number increases as stacked over on the discharge tray 80 with the Δ-marked side facing downward whereas the page number decreases as stacked over on the document tray 10 with the Δ-marked side facing upward.

In the case of single side image reading, each document passes the transport paths only one time. Accordingly, the image reading device can be operated in such a manner that the second document $P_2$ is transported within a relatively short period following the first document $P_1$ as far as there can be avoided a possibility that the lead end of the second document $P_2$ overlies the tail end of the first document $P_1$. Thus, image data reading of a certain number of documents can be sped up.

Figure 4A:
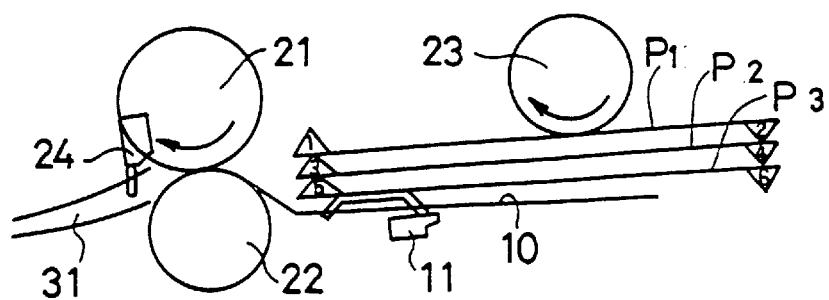
FIGS. 4A to 4I are explanatory diagrams showing a series of procedures of transporting a set of documents for double side image reading in the image reading device.

Next, described is the case of double side image reading with reference to FIGS. 4A to 4I. $P_1$, $P_2$, $P_3$ are documents having image data on both sides thereof. Similar to the case of single side image reading, the side of the document having image data carries the mark Δ and the number inside or nearby the triangle Δ denotes the page number. $P_1$ is the first document; $P_2$ is the second document; and $P_3$ is the third document. Specifically, in this embodiment, as shown in FIG. 4A, the document set $P_1$, $P_2$, $P_3$ are stacked on the document tray 10 in such a manner that the first page comes at the uppermost position facing upward with the page number increasing as stacked down.

As shown in FIG. 4A, a user sets the documents $P_1$, $P_2$, $P_3$ in the order mentioned above. Then, the user selects a double side image reading mode, and designates the controller 90 to initiate image reading via the enter means 94 such as the start key. If the document detecting sensor 11 detects the presence of the document on the document tray 10, the controller 90 starts double side image reading operation. At this time, the discharge changeover lever 42 is set at such a position as to open the fourth transport path 34, and the inverting/non-inverting changeover lever 45 is set at such a position as to open the first transport path 31 to guide the document toward the document inverting unit 60.

Similar to the operation in the single side image reading, the documents $P_1$ to $P_3$ set on the document tray 10 are separated by the document separator/feeder unit 20 to feed the uppermost document $P_1$ toward the first transport path 31. While guided along the first transport path 31, the document $P_1$ reaches the second intersecting point 44.

Figure 4B:
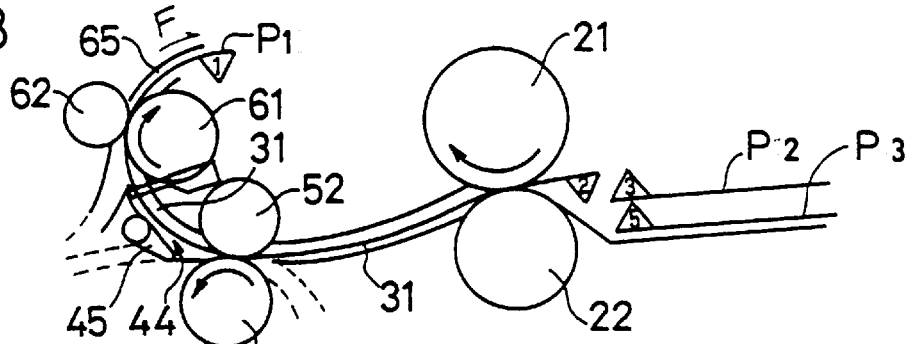

Upon reaching the second intersecting point 44, as shown in FIG. 4B, the document $P_1$ is guided into the document inverting unit 60 by the inverting/non-inverting changeover lever 45 set at the position to open the transport path toward the document inverting unit 60. At this time, the controller 90 drives the inverting roller 61 in the clockwise direction (forward direction) and activates the presser means 63 to press the inverting driven roller 62 against the inverting roller 61. Thereby, the lead end of the document $P_1$ guided in the document inverting unit 60 is nipped between the inverting roller pair 61 and 62 and transported along the inverting path 65 in the F direction by the forward rotation of the inverting roller 61.

It should be noted that the document exiting the document inverting unit 60 is flipped over with respect to the document entering the document inverting unit 60 and the leading end of the document entering the document inverting unit 60 is now the trailing end of the document exiting the inverting unit 60.

Figure 4C:
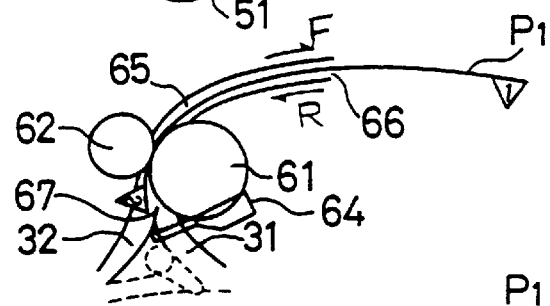

When the forward/reverse detecting sensor 64 detects the tail end of the document $P_1$ in the F direction, the controller 90, as shown in FIG. 4C, suspends the driving of the inverting roller 61 in the nipped state of the document $P_1$ between the inverting roller pair 61 and 62. At this time, in the case where the document $P_1$ has the longer side in the transport direction along the inverting path 65, the lead end of the document $P_1$ is temporarily exposed outside the main body of the image reading device through the opening 66 of the inverting path 65.

When the lead end of the document $P_1$ is exposed outside, it is highly likely that the lead end interferes the documents $P_2$, $P_3$ set on the document tray 10. However, since being held firmly downward by the forward roller 23, the documents $P_2$, $P_3$ can be prevented from being pushed by the document $P_1$ on the way of switching back the transport direction along the inverting path 65 and sliding off from the document tray 10.

Subsequently, the controller 90 drives the feed drive motor 91 in the reverse direction to rotate the inverting roller 61 in the counterclockwise direction (reverse direction). Thereby, the transport direction of the document $P_1$ on the inverting path 65 is inverted. The document $P_1$ having the transport direction inverted is transported into the second transport path 32 while being guided along the projecting wall 67 at the intersecting portion (below the inverting roller pair 61, 62) located on the lower portion of the document inverting unit 60. Thus, while the document $P_1$ being transported in and out of the document inverting unit 60, the lead end of the document $P_1$ in the F direction turns into the tail end of the document $P_1$ in the R direction and the document $P_1$ flip-flops in the document inverting unit 60.

Figure 4D:
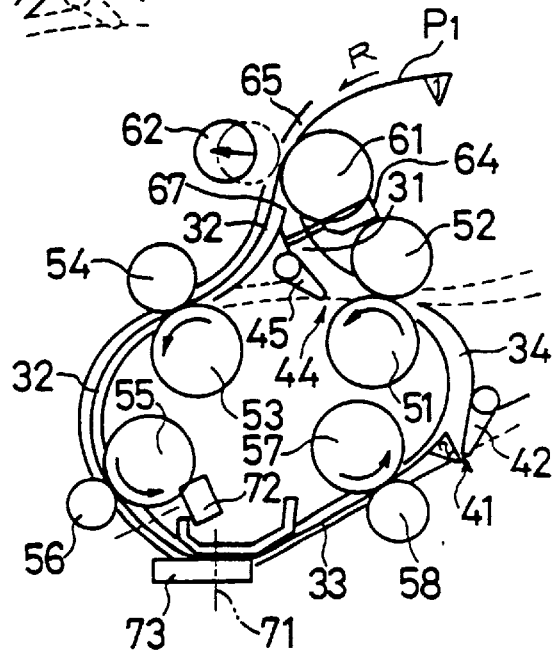

Similar to the single side image reading, the document $P_1$ guided in the second transport path 32 is transported to the image reading position 71 by the upper roller pair 53, 54 and the lower roller pair 55, 56. Then, when the timing sensor 72 detects the lead end of the document $P_1$, as shown in FIG. 4D, the controller 90 allows the image reading unit 70 to read image data on the side of the document $P_1$ facing the image reading position 71 at a certain timing after the detection of the timing sensor 72. At this time, since the second page faces downward at the image reading position 71, the image data on the second page is read.

When the timing sensor 72 detects the lead end of the document $P_1$, the controller 90 also activates the presser means 63 to set the inverting driven roller 62 away from the inverting roller 61 to release the nipped state of the document $P_1$. Further, the controller 90 changes the rotating direction of the feed drive motor 91 to rotate the registration roller 51 and the inverting roller 61 in the forward direction.

The reason for releasing the nipped state of the document $P_1$ at the above timing is because the rotating force of the inverting roller 61 is no more required since the transport of the document $P_1$ along the second transport path 32 is secured by the upper roller pair 53, 54 and the lower roller pair 55, 56 after the lead end of the document $P_1$ has reached the image reading position 71. Further, the reason for rotating the registration roller 51 and the inverting roller 61 in the forward direction is to guide the document $P_1$ again to the document inverting unit 60 for turning the side thereof.

Figure 4E:
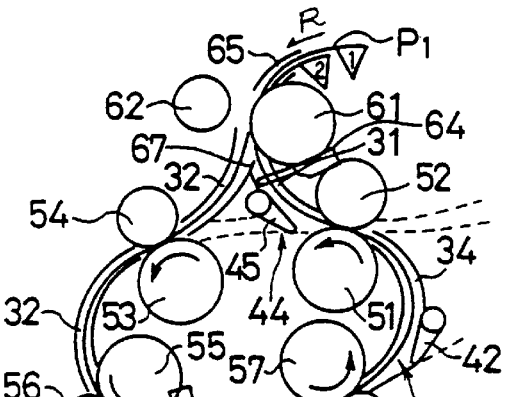

When the document $P_1$ is transported along the third transport path 33 from the image reading position 71 to the first intersecting point 41, the document $P_1$ is guided to the fourth transport path 34 by the discharge changeover lever 42. While transported along the fourth transport path 34, the document $P_1$ comes into the first transport path 31 at the joining portion between the first transport path 31 and the fourth transport path 34, and transported again into the document inverting unit 60 by the registration roller pair 51, 52. At this time, in the case where the document $P_1$ has the longer side thereof along the transport direction, as shown in FIG. 4E, there is a possibility that the lead end and the tail end of the document $P_1$ cross over each other between the inverting roller pair 61, 62. However, since the inverting driven roller 62 is set away from the inverting roller 61 at this time, the document $P_1$ transported between the inverting roller pair 61, 62 can be freely movable in the vertical direction in the clearance defined between the inverting roller pair 61, 62. Accordingly, the document $P_1$ is transported in such a manner that the tail end thereof is guided in the second transport path 32 from the document inverting unit 60 and the lead end thereof is guided in the document inverting unit 60 via the first transport path 31.

Figure 4G:
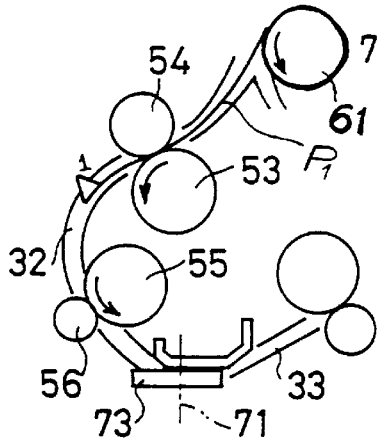
Figure 4F:
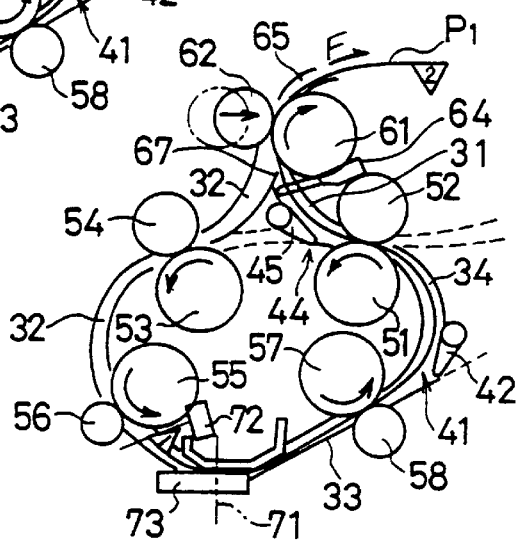

When the timing sensor 72 detects the tail end of the document $P_1$, the controller 90 controls the image reading unit 70 to suspend the image reading of the document $P_1$ at a certain timing after the detection. Also, the controller 90, as shown in FIG. 4F, controls the presser means 63 to press the inverting driven roller 62 against the inverting roller 61. Thereby, the lead end of the document $P_1$ is nipped between the inverting roller pair 61 and 62, and transported again to the inverting path 65 by a forward rotation of the inverting roller 61 as shown in FIG. 4G.

When the forward/reverse detecting sensor 64 detects the tail end of the document $P_1$, the controller 90 controls the feed drive motor 91 to suspend the rotation of the inverting roller 61, and then reverse the rotation of the inverting roller 61. Thereby, the transport direction of the document $P_1$ is inverted, and the document $P_1$ is discharged to the second transport path 32 this time with the first page facing down. At this time, the controller 90 controls the discharge changeover lever 42 to be set at the position to open the transport path 33 toward the discharge tray 80.

Figure 4H:
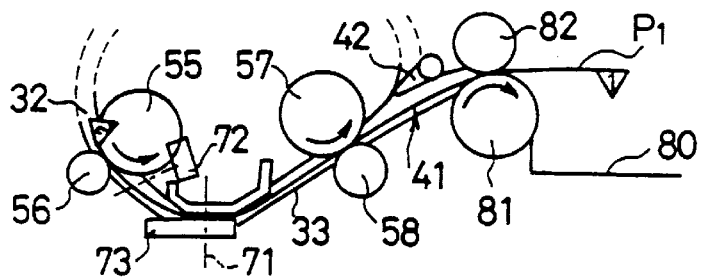

The document $P_1$ guided to the image reading position 71 along the second transport path 32 has the first page facing downward, as shown in FIG. 4H. Accordingly, the image reading unit 70 reads the image data on the first page at this time. After the image reading, similar to the single side image reading, the document $P_1$ is guided by the discharge changeover lever 42 and discharged onto the discharge tray 80 by the discharge roller pair 81, 82 with the first page facing downward.

Figure 4I:
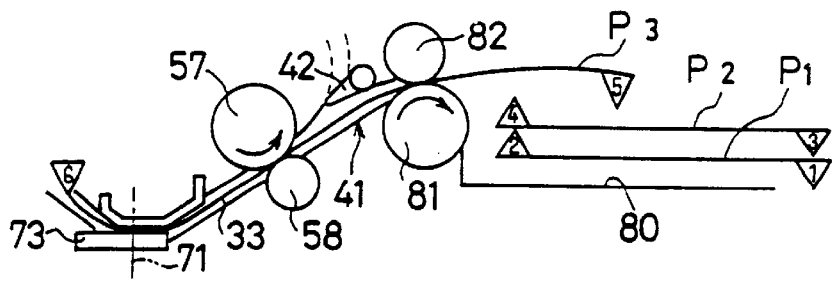
Figure 6A:
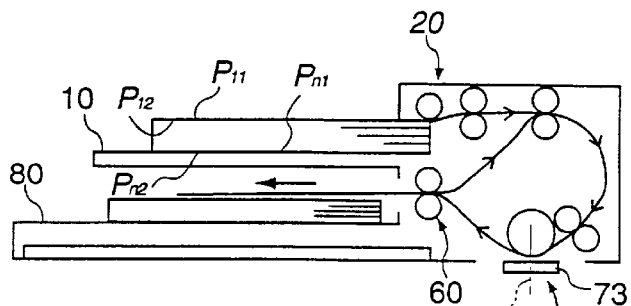
FIGS. 6A–6E are explanatory diagrams showing an example of image reading devices and an example of image reading operation of prior art.
Figure 6B:
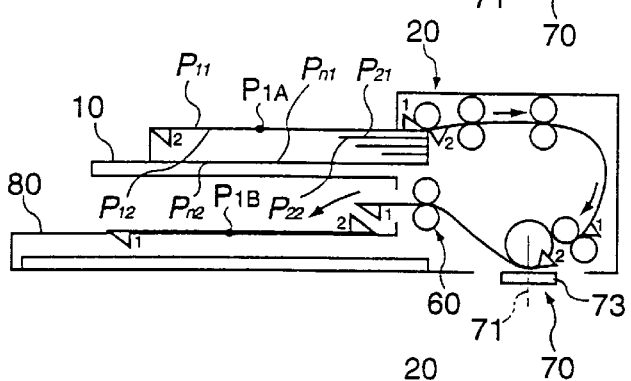
Figure 6C:
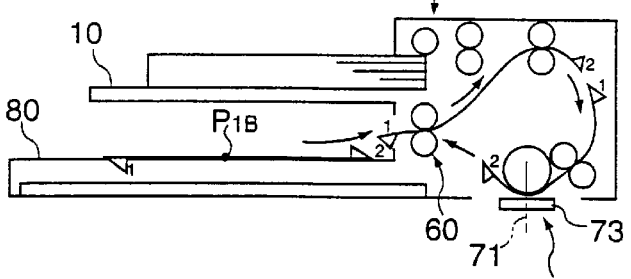
Figure 6D:
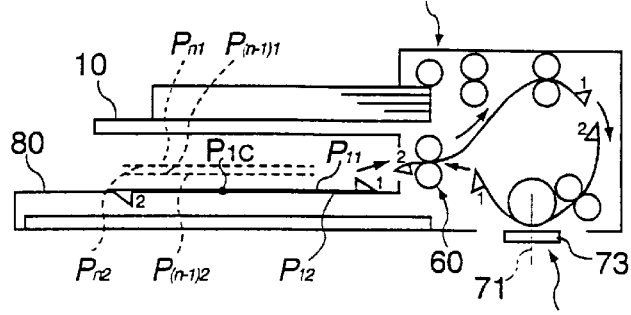
Figure 6E:
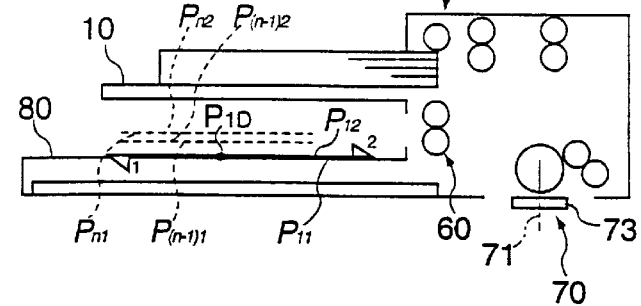

In this way, image reading on both sides of the document $P_1$ (first page and second page) is completed. Likewise, image reading on both sides of the documents $P_2$, $P_3$ are performed in the same manner as the first document $P_1$. Specifically, as shown in FIG. 4I, the documents $P_1$, $P_2$, $P_3$ after the double side image reading are stacked on the discharge tray 80 with the first page, third page, and the fifth page facing downward and in the order of $P_1$, $P_2$, $P_3$ from the lowermost position. In other words, the documents $P_1$, $P_2$, $P_3$ are stacked on the discharge tray 80 in the same order as the document tray 10 except that the page number increases (or decreases) on the discharge tray 80 in the order opposite to the document tray 10.

Also, in the case of double side image reading, the image reading device is operated to start feeding the second document $P_2$ upon confirming that the timing sensor 72 detects the tail end of the document $P_1$ (see FIG. 4H) which has passed through the document inverting unit 60 twice. Accordingly, image reading of a number of documents can be sped up.

In the above double side image reading, image data on the second page (even number page) of a document is read prior to the first page (odd number page of the same document). Alternatively, 1) storing image data on the second page as, e.g., electrical data in a storage medium such as a memory, 2) reading and outputting the first page data, and 3) reading out/outputting the stored second page data enables image data outputting in the order of page number, although the image reading does not follow the order of page number.

As mentioned above, in the inventive image reading device, a document passes the image reading position 71 of the image reading unit 70 only twice, the minimum number required for double side image reading. Accordingly, compared to the conventional image reading device shown in, e.g., FIGS. 6A to 6E where one document passes the image reading position 71 three times, smear on the contact glass 73 at the image reading position 71 can be suppressed.

The document separator/feeder unit 20 is so constructed as to separate and feed the documents stacked on the document tray 10 one by one from the uppermost document. Accordingly, compared to a case of separating and feeding the documents one by one from the lowermost document, smear on a side of a document due to contact of a side of the next document carrying image data can be suppressed.

The document inverting unit 60 is disposed at a level higher than the document tray (document setting portion) 10 and the discharge tray (document discharge portion) 80. In other words, the document inverting unit 60 is set at an upper portion relative to the device main body. This arrangement enables constructing the document inverting unit 60 in a versatile manner by utilizing the upper space of the device main body.

The discharge tray 80 is located on the same side as the document tray 10 relative to the image reading position 71 and disposed below the document tray 10 with a certain area thereof vertically overlying with a certain height difference. Accordingly, the horizontal dimension of the image reading device can be reduced.

The inverting path 65 adapted for flip-flopping the document by inverting the transport direction of the document is formed with the opening 66 at one end to communicate with the outside of the device main body. In this arrangement, the outside space as well as the inverting path 65 can be utilized as a space to switchback the transport direction of the document. Accordingly, the length of the inverting path 65 does not necessarily have to cover the longer side of the document to be transported. This arrangement can omit a sub tray for receiving the document on the way of switchback. Thereby, the vertical dimension of the image reading device can be reduced.

The document tray 10 is the only tray disposed above the discharge tray 80. Accordingly, merely lifting the document tray 10 enables a user to take out the document set stacked on the discharge tray 80, thereby improving handling operation of the document set after image reading.

The feed roller 23 of the document separator/feeder unit 20 presses the document set stacked on the document tray 10 downward. Accordingly, there can be prevented a possibility that the document(s) on the document tray 10 may slide off therefrom by the lead end of the document exposed through the opening 66 even if the document is on the way of inverting the transport direction along the inverting path 65.

The image reading device is designed to transport a document along every transport path except the inverting path 65 in the same direction (forward direction). Accordingly, the drive rollers such as the rollers 51, 53, 55, 57, and 81 can be designed to rotate in the same direction except the inverting roller 61. Thereby, the construction and control of the motor to drive these drive rollers can be simplified.

Stabilizing the transport speed of the document at the image reading position 71 is essential when pursuing high precision image reading. The lower transport roller 55 and the intermediate roller 57 provided in the vicinity of the image reading position 71 are designed to rotate merely in the forward direction. Accordingly, a backlash in these drive rollers 55 and 57 is suppressed, thereby stabilizing the rotating speed of these drive rollers 55 and 57. As a result, image reading precision at the image reading position 71 can be improved.

Further, since the image reading device is provided with the fifth transport path 35, passing a document carrying single side image data at the image reading position 71 for one time enables the image reading and discharging the document on the discharge tray 80. Thereby, also in the case of single side image reading, smear on the contact glass 73 at the image reading position 71 can be suppressed as much as possible, while securing high image reading performance.

The document tray 10 is disposed above the discharge tray 80. In this arrangement, a document carrying single side image data flip flops on the way toward the image reading unit 70 as transported along the fifth transport path 35, with the result that the image reading unit 70 enables image data reading on the document side facing downward. Namely, the image reading device enables stacking a document set on the document tray 10 with the side of the image data facing upward. This arrangement is user-friendly when handling the document set.

The following modifications and alterations can be applied to the image reading device of the invention.

(1) In the above embodiment, the first transport path 31 and the second transport path 32 intersect immediately below the inverting roller pair 61, 62 of the document inverting unit 60. Alternatively, the transport path below the inverting roller pair 61, 62 may be formed into a single path and that the single path may join the first transport path 31 and the second transport path 32 at a certain position.

(2) In the foregoing embodiment, the projecting wall 67 is provided as a regulating means for regulating the transport direction of the document such that the document transported into the document inverting unit 60 along the first transport path 31 is guided along one side of the projecting wall 67 and the document transported out of the document inverting unit 60 is guided into the second transport path 32 along the other side of the projecting wall 67. As a modification, one of known regulating means such as a switching lever may be used in place of the projecting wall 67.

(3) In the aforementioned embodiment, providing the opening 66 of the inverting path 65 above the feed roller 21 eliminates the necessity of lengthening the inverting path 65. The length of the inverting path 65 may be set in a manner other than the above embodiment. For instance, the length of the inverting path 65 may be set at such a size as to receive the longer side of A4-size document, the most frequently used size. In such a case, the document inverting unit 60 may be constructed such that the opening 66 is accessible to the exterior of the device main body to expose the lead end of the document only when a document of larger size, e.g., A3-size is to be inverted along the inverting path 65. Alternatively, the inverting path 65 may be formed to have such a size as to receive the longer side of the maximum size document. In such a case, the opening 66 can be omitted.

(4) In the above embodiment, the separation roller 22 of the document separator/feeder unit 20 is so arranged as to follow a rotation of the feed roller 21 while pressed against the feed roller 21 and causing a friction resistance during the rotation thereof. As an altered arrangement, the separation roller 22 may be constructed to rotate in a direction opposite to the rotating direction of the feed roller 21 in contact therewith.

(5) In the above embodiment, the fifth transport path 35 is provided to transport a document directly to the image reading position 71 without passing the document inverting unit 60 for one side image reading. As an alteration, the fifth transport path 35 may be omitted. In such a case, transporting the single side image data document in the same transport order as the double side image reading enables the single side image reading and discharging the document set in the same order as the document tray 10, although one of the passing operations of the document at the image reading position 71 does not accompany image reading operation.

(6) In the aforementioned embodiment, one measures is proposed to output image data from the first page and in the page order: 1) storing image data on the second page as electrical data in a storage medium such as a memory, 2) reading and outputting the first page data, and 3) reading out/outputting the stored second page data. Such electrical storage means may be omitted. For instance, in the case of using a copying machine, second page image data is copied on a copy sheet, and the copy sheet is held in a machine main body. Then, after copying first page image data and discharging a copy sheet carrying the first page image data, the copy sheet carrying the second page image data is discharged.

(7) In the aforementioned embodiment, the feed drive motor 91 and the transport drive motor 92 are used to drive the various drive rollers to transport the document in the predetermined direction. The number of motor may be one or more than two. Further, the rotating speed of each of the drive rollers may be set variable to change the document transport speed according to needs. Thereby, in the case of requiring high precision image reading, the document transport speed may be set low level to enhance the image reading performance.

(8) In the foregoing embodiment, the image reading unit 70 is a digital image reader. As an altered arrangement, the image reading device may adopt an analog type image reader.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A document transporting device for transporting a set of documents to a predetermined image reading position successively to enable reading of image data on both sides of each of the documents comprising:

a document tray on which a set of documents are stacked;

a document separator/feeder unit for separating the set of documents and feeding the documents one by one from an uppermost document thereof;

a document inverting unit for inverting the document with respect to a transport direction thereof;

a discharge tray for discharging the document after a double side image reading operation;

a first transport path for guiding the document fed by the document separator/feeder unit to the document inverting unit;

a second transport path for guiding the document from the document inverting unit to the image reading position;

a third transport path for guiding the document from the image reading position to the discharge tray;

a fourth transport path intersecting the third transport path at a first intersecting point in the third transport path and joining the first transport path to guide the document from the first intersecting point to the document inverting unit; and a first switching means for changing the transport path at the first intersecting point between the third transport path located on the side of the discharge tray with respect to the first intersecting point and the fourth transport path.

2. The document transporting device as recited in claim 1, wherein the document inverting unit is disposed above the document tray and the discharge tray.

3. The document transporting device as recited in claim 2, wherein the discharge tray is disposed below the document tray.

4. The document transporting device as recited in claim 3, wherein the document inverting unit is so constructed that the document guided along the first transport path is transported in a first direction along an inverting path of the document inverting unit and then transported along the inverting path in a second direction opposite to the first direction toward the second transport path, and a lead end of the inverting path with respect to the first direction has an opening opened outward of a main body of the document transporting device.

5. The document transporting device as recited in claim 1, further comprising:

a fifth transport path intersecting the first transport path at a second intersecting point on the way of the first transport path and joining the second transport path to directly guide the document transported along the first transport path to the image reading position via the second intersecting point; and a second switching means for changing the transport path at the second intersecting point between the first transport path located on the side of the document inverting unit with respect to the second intersecting point and the fifth transport path.

6. The document transporting device as recited in claim 1, wherein the document inverting unit is so constructed that the document discharged from the document inverting unit is flipped over with respect to the document entering the document inverting unit and the leading end of the document entering the document inverting unit becomes the trailing end of the document exiting the document inverting unit.

7. The document transporting device as recited in claim 1, wherein the document inverting unit has an inverting path that is connected to the first and second transport paths.

8. The document transporting device as recited in claim 7, wherein the inverting path is upwardly extended from the first document path and curved to the side of the document tray.

9. An image reading device capable of reading image data on both sides of a document comprising:

a document tray on which a set of documents are stacked;

a document separator/feeder unit for separating the set of documents and feeding the documents one by one from an uppermost document thereof;

a document inverting unit for inverting the document with respect to the transport direction thereof;

an image reader unit for reading the image data of the document transported at the image reading position;

a discharge tray disposed on the same side as the document tray with respect to the image reading position for discharging the document after a double side image reading;

a first transport path for guiding the document fed by the document separator/feeder unit to the document inverting unit;

a second transport path for guiding the document from the document inverting unit to the image reading position;

a third transport path for guiding the document from the image reading position to the document discharge tray;

a fourth transport path intersecting the third transport path at a first intersecting point in the third transport path and joining the first transport path to guide the document from the first intersecting point to the document inverting unit; and a first switching means for changing the document transport path at the first intersecting point between the third transport path located on the side of the discharge tray with respect to the first intersecting point and the fourth transport path.

10. The image reading device as recited in claim 9, wherein the document inverting unit is disposed above the document tray and the document discharge tray.

11. The image reading device as recited in claim 9, wherein the discharge tray is disposed below the document tray.

12. The image reading device as recited in claim 10, wherein the document inverting unit is so constructed that the document guided along the first transport path is transported in a first direction along an inverting path of the document inverting unit and then transported along the inverting path in a second direction opposite to the first direction toward the second transport path, and a lead end of the inverting path with respect to the first direction has an opening opened outward of a main body of the document transporting device.

13. The document transporting device as recited in claim 9, further comprising:
   a fifth transport path intersecting the first transport path at a second intersecting point on the way of the first transport path and joining the second transport path to directly guide the document transported along the first transport path to the image reading position via the second intersecting point; and
   a second switching means for changing the transport path at the second intersecting point between the first transport path located on the side of the document inverting unit with respect to the second intersecting point and the fifth transport path.

* * * * *